Figure 1:
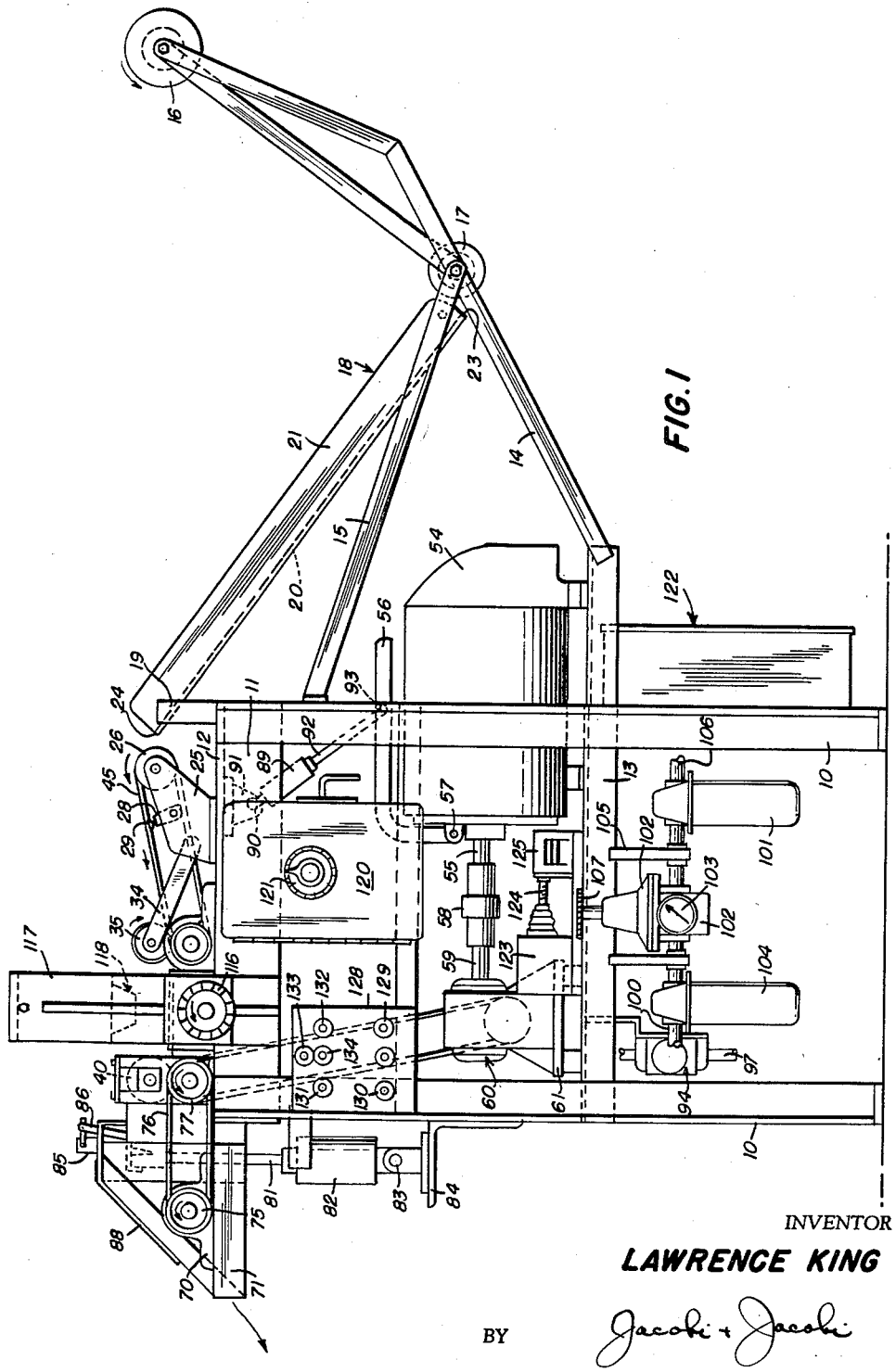

June 7, 1960

L. KING 2,939,354

AUTOMATIC CUT-OFF APPARATUS FOR STRIP MATERIAL
HAVING PHOTOELECTRIC CONTROL MEANS

Filed July 8, 1959

5 Sheets-Sheet 1

INVENTOR
LAWRENCE KING

BY Jacobi + Jacobi

ATTORNEYS

INVENTOR
LAWRENCE KING

BY

ATTORNEYS

INVENTOR
LAWRENCE KING

ATTORNEYS

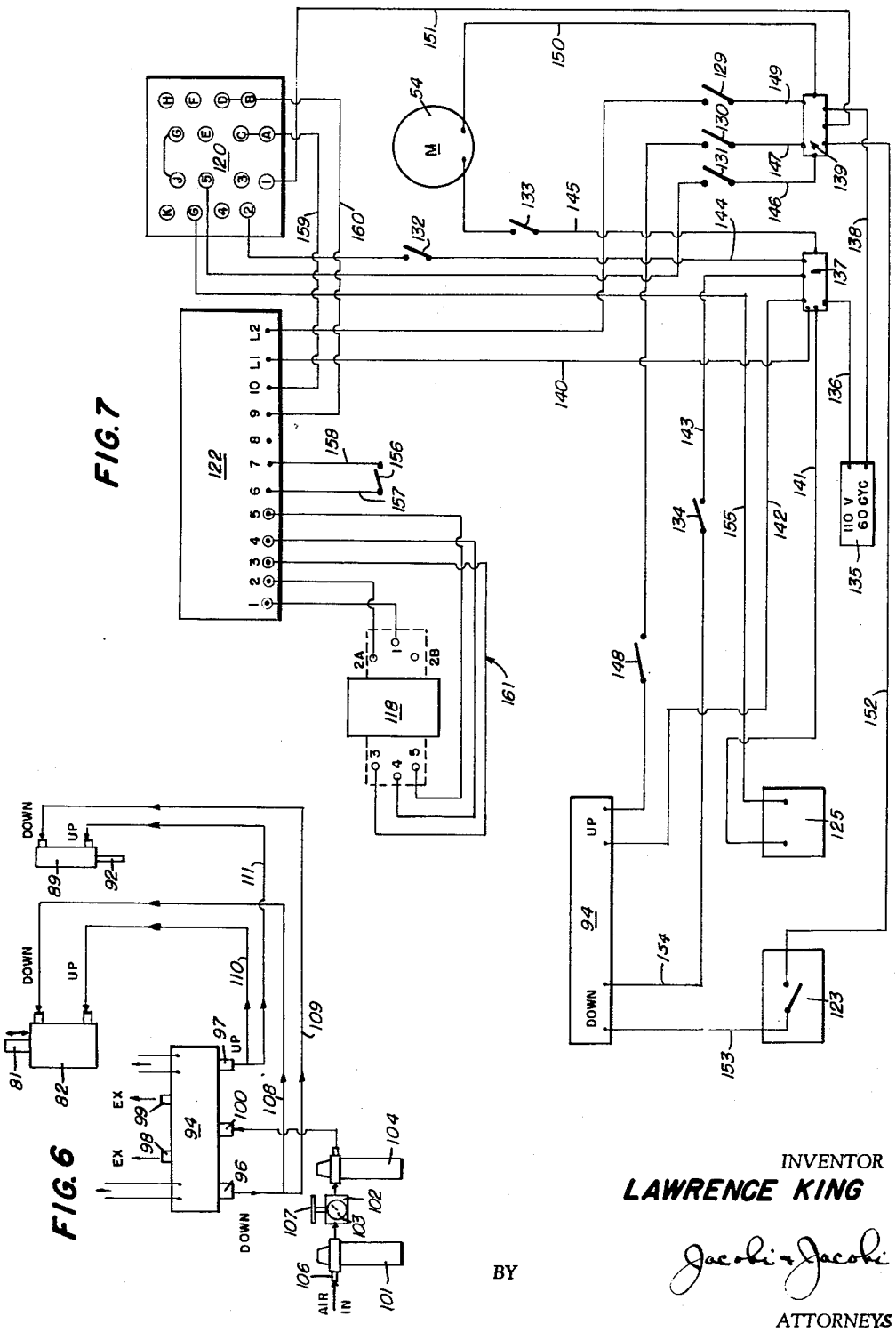

United States Patent Office 2,939,354
Patented June 7, 1960

2,939,354

AUTOMATIC CUT-OFF APPARATUS FOR STRIP MATERIAL HAVING PHOTOELECTRIC CONTROL MEANS

Lawrence King, New York, N.Y., assignor to Pyramid Mfg. Co. Inc., New York, N.Y.

Filed July 8, 1959, Ser. No. 825,804

10 Claims. (Cl. 83—165)

This invention relates to cutting apparatus and more particularly to an automatic cut off apparatus for strip material. While the apparatus of this invention is primarily intended to be utilized for automatically and rapidly cutting off an accurate predetermined length of dimensionally unstable strip material such as knitted goods, the apparatus may also be utilized for cutting off dimensionally stable strip material in any desired length.

Tubular fabric having longitudinally spaced flaired portions is commonly knitted in continuous lengths and such fabric is subsequently cut to predetermined length for providing cuffs in the sleeves of garments or for other purposes. As is well known, knitted fabrics are dimensionally unstable and it is extremely difficult to cut accurate lengths thereof for future use, since the material frequently stretches or shrinks during the cutting process depending upon the manner of feeding the same or of handling thereof and consequently this cutting operation has heretofore been time consuming and relatively costly. Where it has been attempted to utilize automatic cut off machines for this type of material efforts have been made to utilize a photo-electric control for the cutting operation, but difficulty has been experienced due to the dimensional instability of the material, as well as the relatively uneven surface and where knots or other enlargements in the material, as well as markings thereon have been utilized to initiate operation of the photoelectric control, this has proved unreliable due to the fact that operation of the control is often initiated by imperfections in the material other than the knots or other markings applied thereto and likewise the spacing between the markings has varied due to the dimensional instability of the material thereby resulting in inaccurately cut lengths. This has resulted in requiring a large portion of this type of cutting to be done by hand or at best, by manually controlled cutting apparatus which has, of course, resulted in materially increasing the cost of such operation as compared to the cost of high speed automatic cutting operations.

Briefly stated, the automatic cut off apparatus of this invention is provided with means for supplying a continuous length of strip material from which the same is automatically centered and presented to a feeding roll having a hold down roll movably mounted for holding the material in engagement with the feeding roll from which such material passes across the upper surface of a mirror and between two driven feeding rolls from which the material pases beneath a movable knife and over a driven delivery roll. A combined light source and light sensitive element is mounted above the mirror for adjustment transversely of the path of movement of the material across the mirror and this provides a scanner which is connected to an electronically operated timer switch. A drive motor is connected through a combined clutch and brake to a speed reduction gearing which in turn is connected to the feeding rolls and delivery roll in order to drive the same in synchronism. A pneumatic cylinder is provided for actuating the cut off knife and a second pneumatic cylinder is provided for operating the combined clutch and brake. The operation of such pneumatic cylinders is controlled by a four-way solenoid valve which in one position causes operation of the pneumatic cylinders in one direction and in the other position causes operation of the pneumatic cylinders in the opposite direction. A spring operated solenoid return switch is connected to the solenoid valve for operating the same to one position and a combined knife return and scanner reset switch mounted in the path of movement of the knife at the lower limit of travel thereof, which switch controls the operation of the solenoid valve to the other position and also resets the scanner for a subsequent operation. The material to be cut moves across the mirror at a speed determined by the speed of rotation of the feeding rolls and since all of the rolls operate in synchronism, the tension in the fabric is held substantially constant which results in the feeding of an accurately predetermined length and upon movement of a flaired portion of the material through the beam of light reflected from the mirror to the light sensitive element, such beam is interrupted which serves to initiate operation of the timer switch to start a timing cycle. Movement of the material beneath the cut off knife continues at the predetermined rate unil completion of the timing cycle, at which time the knife is actuated to cut off the material and consequently the length of such cut off piece of material is determined by the length of the timing cycle, rather than by the spacing of the means on the material which serves to initiate operation of the light sensitive element in the scanner. As a result, the length of the cut off piece is accurately determined since such length is not in any way adversely affected by the stretch or shrinkage of the material. Furthermore, operation of the clutch and brake serves to momentarily stop travel of the material during the cutting operation and this likewise, materially contributes to the accuracy of the operation.

The apparatus of this invention may also be used equally well for cutting off lengths of strip material which is dimensionally stable and while with the knitted material mentioned above, a structural characteristic of such material is utilized to initiate operation of the scanner, other means may be employed for this purpose with both knitted material or with dimensionally stable material and furthermore, if desired, the apparatus may be operated for certain special purposes without utilizing the scanner by merely utilizing the timer switch which may be adjusted at will to provide any desired length of timing cycle thereby controlling the length of the piece to be cut off. This type of operation, however, would to a certain extent depend upon the skill of the operator in properly setting the timing cycle, but where a structural characteristic of the strip material or other tripping or marking means is utilized to initiate operation of the scanner, it is only necessary to preset the timer switch to the desired timing cycle and thereafter operation of the apparatus will be entirely automatic.

It is accordingly an object of the invention to provide automatic cut off apparatus which may be conveniently and economically manufactured from readily available materials and which will operate to automatically and accurately cut off predetermined lengths of strip material.

A further object of the invention is the provision of an automatic cut off apparatus which may be utilized for automatically and accurately cutting off lengths of strip material which is dimensionally unstable.

A still further object of the invention is the provision of automatic cut off apparatus for strip material in which operation of such apparatus is initiated by a structural characteristic of the material and in which the accuracy of the cutting operation does not depend on the spacing between the means for initiating operation of the apparatus.

Another object of the invention is the provision of an automatic cut off apparatus for strip material in which the length of the piece to be cut off may be conveniently varied at will during the operation of the machine and without regard to the spacing of tripping means provided on the material.

A further object of the invention is the provision of automatic cut off apparatus for dimensionally unstable strip material and in which the length of the piece to be cut off is determined by the length of the timing cycle which is related to the rate of speed of the material thereby rendering the cut off operation independent of shrinkage or stretch of the material.

A still further object of the invention is the provision of an automatic cut off apparatus for dimensionally unstable strip material in which such material is momentarily at rest during the cut off operation.

Another object of the invention is the provision of an automatic cut off apparatus for strip material in which a combined light source and light sensitive element is actuated by the passage of a portion of the material to the light beam, the light sensitive element thereafter initiating operation of a timer switch, which upon completion of a predetermined timing cycle causes operation of a cut off knife to provide an accurately predetermined cut off length of material.

A further object of the invention is the provision of automatic cut off apparatus for strip material in which the cut off operation is repeated and automatically controlled solely by the successive completion of a preset timing cycle.

A still further object of the invention is the provision of automatic cut off apparatus for strip material in which a photo-electric scanner is utilized to initiate a sequence of control operations and in which such scanner is conveniently adjustable to adapt the same to different widths and structural characteristics of the strip material.

Another object of the invention is the provision of automatic cut off apparatus for dimensionally unstable strip material in which the tension in the material during passage through the apparatus is held substantially constant in order to eliminate variations in length due to stretch or shrinkage of the material.

Figure 2:
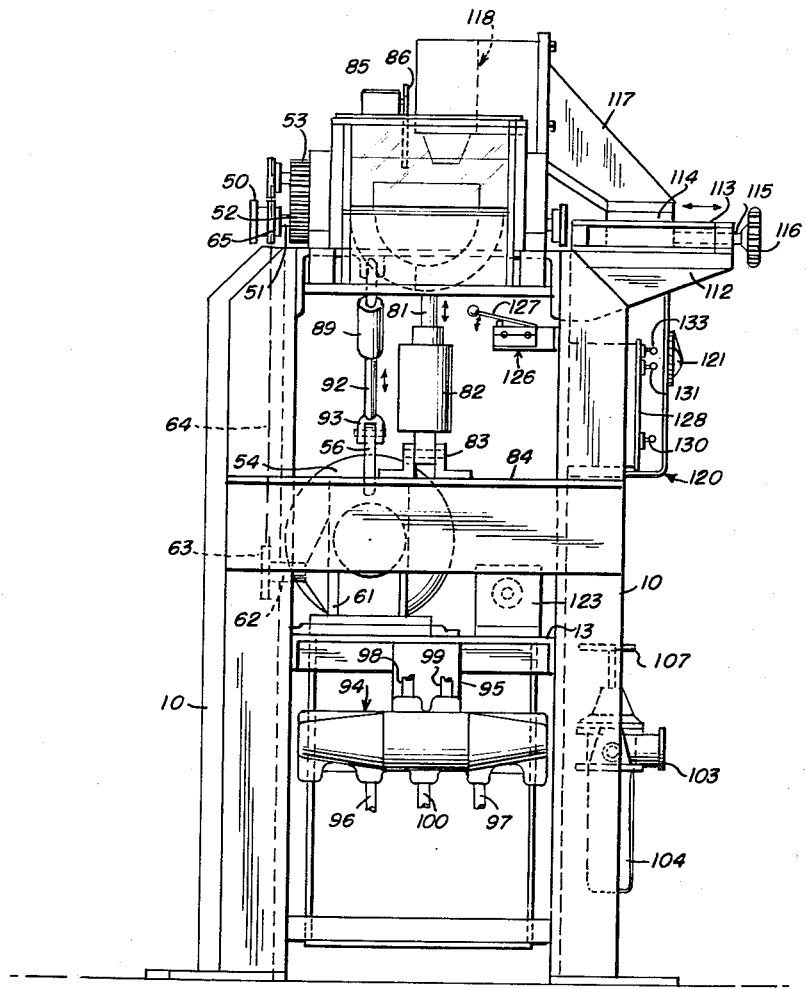
Figure 3:
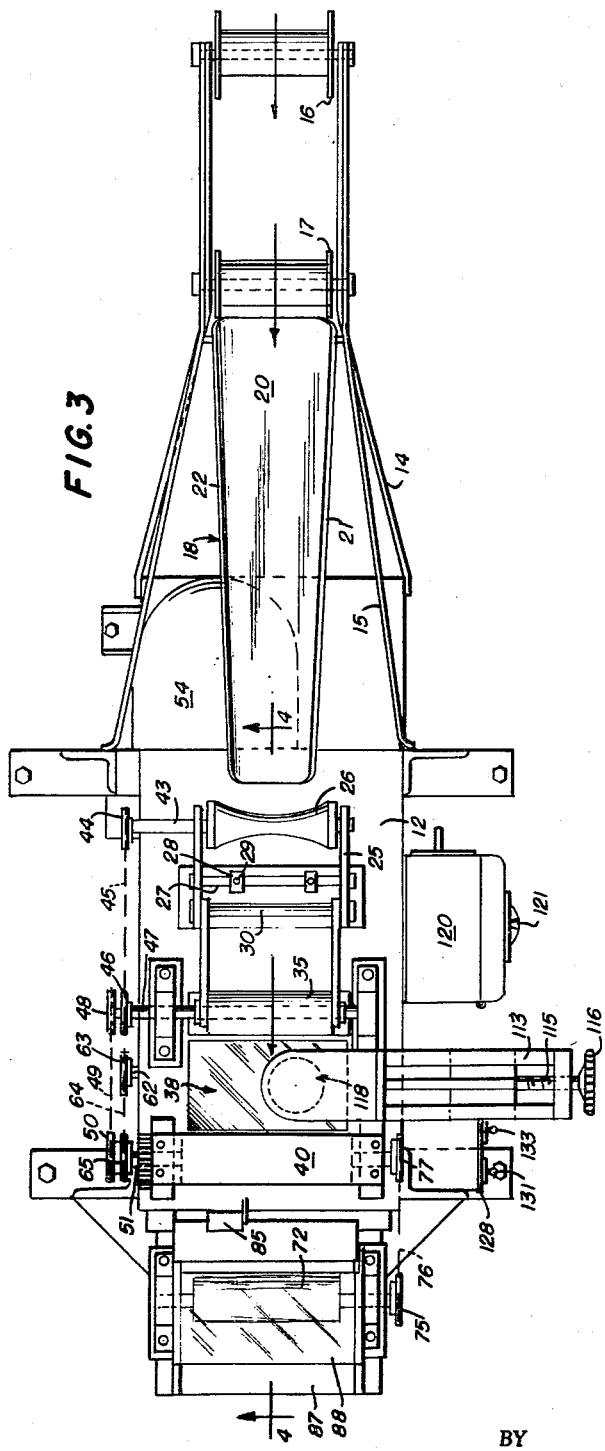
Figure 4:
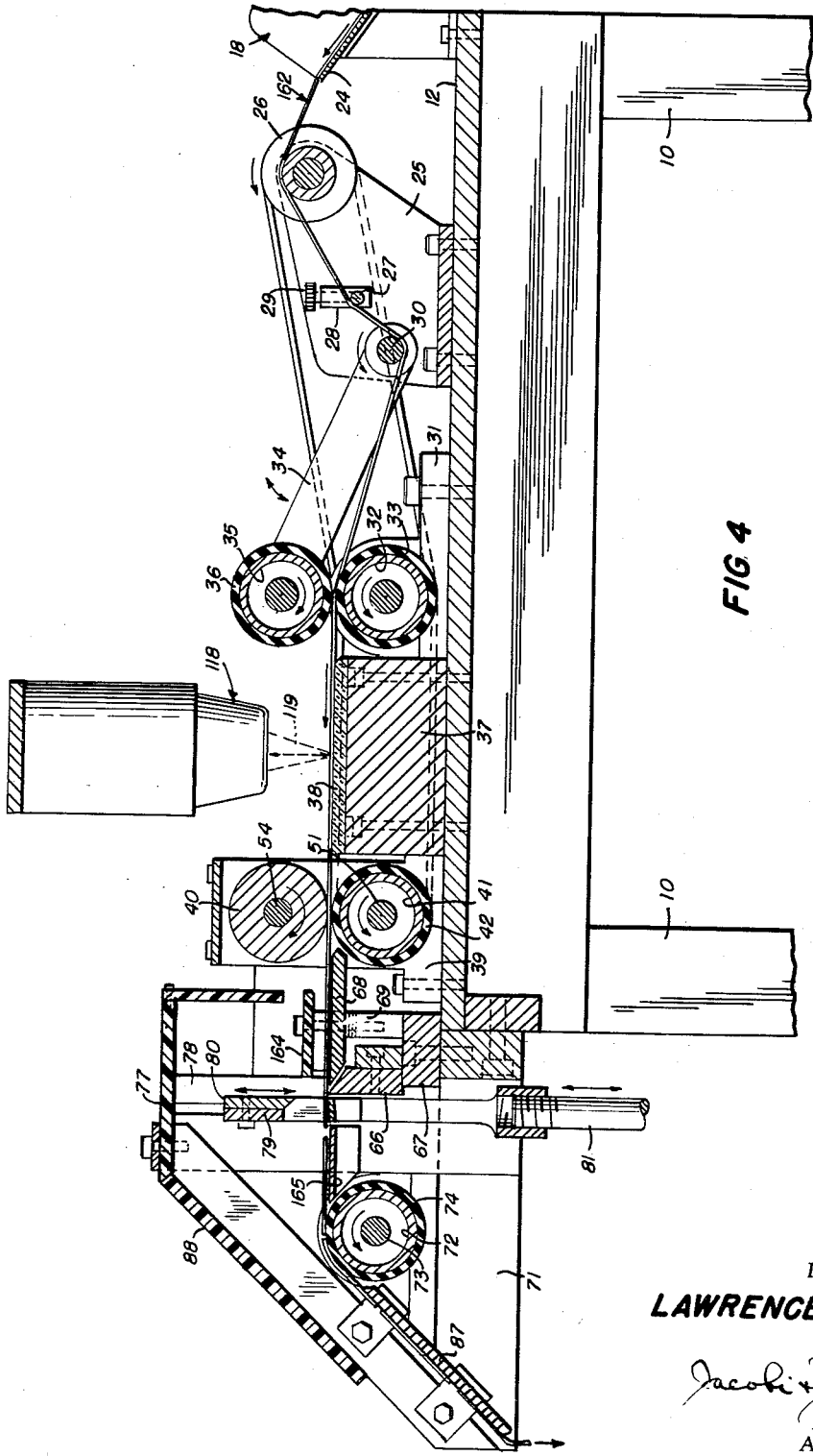

Further objects and advantages of the invention will be apparent from the following description taken in conjunction with the accompanying drawings wherein:

Fig. 1 is a side elevational view of an automatic cut off apparatus constructed in accordance with this invention;

Fig. 2 an end elevational view of the apparatus of this invention as viewed from the left side of Fig. 1;

Fig. 3 a top plan view of the apparatus shown in Fig. 1;

Fig. 4 a fragmentary longitudinal sectional view taken substantially on the line 4—4 of Fig. 3;

Fig. 5 a top plan view of the strip material primarily intended to be cut by the apparatus of this invention;

Fig. 6 a diagrammatic view showing the pneumatic circuit of the apparatus of this invention; and Fig. 7 a diagrammatic view showing the electrical circuit for the apparatus of this invention.

With continued reference to the drawings, there is shown an automatic cut off apparatus for strip material constructed in accordance with this invention, which apparatus may well comprise a frame formed of corner upright members 10 provided adjacent the top with cross members 11 having an upper supporting surface 12 and with intermediate cross members 13 providing a shelf for supporting certain elements of the apparatus to be later described. Secured to the uprights 10 and extending from the side of the frame of the apparatus of this invention are arms 14 and 15 which serve to rotatably mount rollers which are freely rotatable and over which the material supplied to the apparatus may pass. A tapered inclined guide chute 18 is mounted on the arms 15 and on a bracket 19 secured to the frame and as best shown in Figs. 1 and 3, the chute 18 is provided with a bottom wall 20 and side walls 21 and 22 and the chute 18 tapers from an entrance end 23 adjacent the roller 17 to a discharge end 24 above the upper supporting surface 12 on the frame.

A bracket 25 is mounted on the upper supporting surface 12 of the frame and such bracket 25 serves to rotatably mount a concave material aligning roll 26 disposed adjacent the discharge end 24 of the guide chute 18. Also mounted on the bracket 25 and spaced from the aligning roll 26 is a material engaging bar 27 and adjustably mounted on the bar 27 are spaced material engaging guides 28 which may be provided with set screws or other suitable means 29 for securing the same in adjusted position on the bar 27. Also mounted on the bracket 25 and spaced from the material engaging bar 27 is a material engaging tension bar 30.

Mounted on the supporting surface 12 of the frame adjacent the feed roll 32 is a block 37 to the upper surface of which is secured a mirror 38 with the reflecting surface of the mirror facing upward. Disposed on the opposite side of the block 37 from the feed roll 32 and secured to the supporting surface 12 of the frame is a bracket 39 which serves to rotatably mount upper and lower feeding rolls 40 and 41 with the lower feeding roll 41 being disposed in alignment with the feed roll 32. If desired, the feed roll 41 may be provided with a yieldable surface 42 of rubber of other suitable material.

As best shown in Fig. 3, the material aligning roll 26 is provided with a shaft 43 to which is attached a sprocket or pulley 44. A chain or belt 45 connects the sprocket or pulley 44 on the shaft 43 with a sprocket or pulley 46 mounted on the shaft 47 of the feed roll 32. Also fixed to the shaft 47 is a second sprocket or pulley 48 over which is trained a chain or belt 49 which in turn is trained over a sprocket or pulley 50 fixed to the shaft 51 of the feeding roll 41. A gear 52 is also fixed to the shaft 51 of the feeding roll 41 and the gear 52 meshes with a gear 53 fixed to the shaft 54 of the upper feeding roll 40. Consequently, it will be seen that by reason of the chain or belt 45 the chain or belt 49 and the gears 52 and 53 that the material aligning roll 26, the feeding roll 32 and the upper and lower feeding rolls 40 and 41 must rotate in synchronism.

Mounted on the shelf 13 of the frame is a drive motor 54 provided with an output shaft 55 and the output shaft 55 is provided with a combined clutch and brake, the details of which are not shown, which clutch and brake may be disengaged or applied by a lever 56 pivotally mounted at 57 on the housing of the motor 54. The details of the clutch and brake are not shown for the reason that these are entirely conventional and such clutch and brake is normally supplied as an integral part of the motor 54. The output shaft 55 of the motor 54 is connected by a suitable coupling 58 to the input shaft 59 of the conventional speed reduction gearing 60 mounted on a bracket 61 secured to the shelf 13, the reduction gearing 60 being provided with a power output shaft 62 to which is fixed a sprocket or pulley 63. Turned over the sprocket or pulley 63 is a chain or belt 64 which in turn is trained over a second sprocket or pulley 65 fixed to the shaft 51 of the lower feeding roll 41. It will, therefore, be seen that all of the rolls above described will be driven directly from the motor 54 and in synchronism.

A fixed knife 66 is secured to a bracket 67 mounted on the supporting surface 12 of the frame and disposed between the knife 66 and the upper and lower feeding rollers 40 and 41 is a bed plate 68 mounted on shims 69 which may be utilized to control the vertical position of the bed plate 68 in order that the same will properly support material passing from the rolls 40 and 41 to the fixed knife 66. Spaced from the fixed knife 66 and rotatably mounted on brackets 70 secured to an extension 71 of the frame is a delivery roller 72 having a shaft 73 and the roller 72 may be provided with a yieldable surface 74 of rubber or other suitable material. Fixed to the shaft 73 is a pulley or sprocket 75 and trained over the pulley or sprocket 75 is a chain or belt 76 which in turn is trained over a pulley or sprocket 77 on the opposite end of the shaft 51 of the roll 41 from the pulley or sprocket 65. In this manner, the delivery roll 72 is driven from the shaft 51 and in synchronism with the other rolls.

Spaced vertical guides 77' are provided in a bracket 78 mounted on the extension 71 of the frame and slidably mounted in the guides 77' for vertical movement is a cross head 79 to which is secured a movable knife 80 which cooperates with the fixed knife 66 to provide a shear. A connecting rod 81 is fixed to the cross head 79 at one end and to a piston at the opposite end disposed in a pneumatic cylinder 82 which in turn is connected at 83 to a bracket 84 mounted on the frame. Operation of the pneumatic cylinder 82 serves to move the cross head 79 and knife 80 vertically in the guides 77' for a purpose and in a manner to be later described. A suitable counter 85 may be connected through a linkage 86 with the cross head 79 in order to record the number of operations of the cross head 79 and thereby provide means for counting the number of pieces cut by the apparatus of this invention.

An inclined delivery chute 87 may be mounted on the frame extension 71 adjacent the discharge side of the delivery roll 72 and the roll 72, as well as the cross head 79 and movable knife 80 may be covered by a suitable transparent guard 88 mounted on the bracket 78.

A pneumatic cylinder 89 may be pivotally mounted at 90 on a bracket 91 secured to the frame and the piston of the pneumatic cylinder 89 may be fixed to a connecting rod 92 which in turn is pivotally attached at 93 to the lever 56 for operating the combined clutch and brake on the drive shaft 55 of the motor 54.

A four-way solenoid valve 94 may be mounted on a bracket 95 attached to the shelf 13 and the valve 94 may be provided with a conduit 96 connected to one side of the cylinders 82 and 89 to supply fluid pressure thereto for moving the pistons in one direction and the valve 94 may be provided with another conduit 97 connected to the opposite ends of the cylinders 82 and 89 for moving the pistons in the opposite direction. Exhaust conduits 98 and 99 are connected to the valve 94 and air pressure is supplied to such valve through a supply conduit 100. An air filter 101, a pressure regulator 102, a pressure gauge 103 and a lubricator 104 are supported by a bracket 105 from the shelf 13 and the inlet conduit 100 to the solenoid valve 94 is connected to the lubricator 104 which in turn is connected to the pressure regulator 102 to which is connected the air filter 101. A conduit 106 is connected to the filter 101 and to a suitable source of air under pressure. The pressure regulator 102 is provided with a manually operable control handle 107 by means of which the pressure utilized to operate the cylinders 82 and 89 may be adjusted. The pneumatic circuit is shown diagrammatically in Fig. 6 and from an inspection of this figure, it will be seen that the conduit 96 from the solenoid valve 94 is connected through a conduit 108 to the upper side of cylinder 82 and also through a conduit 109 to the upper side of cylinder 89. In a similar manner, conduit 97 from solenoid valve 94 is connected through a conduit 110 to the lower side of cylinder 82 and through a conduit 111 to the lower side of cylinder 89. The complete operation of the pneumatic circuit will be later described in connection with a description of the operation of the entire apparatus.

A laterally extending bracket 112 is mounted on the frame adjacent the block 37 and the bracket 112 is provided with guides 113 for receiving a slide 114 which by means of a screw threaded member 115 and a hand engaging knob 116 is movable toward and away from the block 37. Mounted on the slide 114 is a bracket 117 to which is attached a combined light source and light sensitive element providing a scanner 118 positioned above the mirror 38 in such a manner that a light beam 119 projected downwardly from the light source within the scanner 118 is reflected from the mirror 38 upwardly to the light sensitive element incorporated in the scanner 118. By means of the hand engaging knob 116 the position of the light beam 119 may be varied transversely of the mirror 38 for a purpose to be later described.

A conventional and commercial available electronically operated timer switch 120 is mounted on the frame and the switch 120 is provided with a control knob 121 for manually adjusting the duration of the timing cycle. A scanner control circuit is incorporated in a housing 122 attached to the frame and this circuit is conventional in every respect and includes the necessary relays and sensitivity control for the light sensitive element in the scanner 118 and this control circuit in the housing 122 is connected to the scanner 118 and to the timer switch 120.

A switch 123 for controlling the operation of the solenoid valve 94 in one direction is mounted on the shelf 113 and the switch 123 is provided with an operating rod 124 connected to the plunger of a solenoid 125. The switch 123 is of the one-way impulse type in which movement in one direction closes and opens the circuit and movement in the opposite direction resets the switch for a subsequent operation. A spring, not shown, serves to actuate the switch 123 to close and open the circuit while the solenoid 125 is utilized to reset the switch 123. The switch and solenoid 125 is connected in the control circuit in a manner to be presently described.

A combination movable knife return switch and scanner reset switch 126 is mounted in the frame and provided with an operating arm 127 disposed in the path of movement of the cross head 79 adjacent to the lower limit thereof. The switch 126 is connected in the solenoid valve circuit, as well as in the scanner control circuit in a manner to be presently described.

A switch panel 128 may be attached to the frame in a position convenient to the operator and mounted on the panel 128 are a plurality of conventional toggle switches 129, 130, 131, 132, 133 and 134 for controlling the supply of electrical energy to the electrical components of the apparatus.

With particular reference to Fig. 7, there is shown a wiring diagram of the apparatus of this invention and in which a source of electrical energy designated at 135 and which may be the conventional power lines is connected through a conductor 136 to a terminal board 137 while the opposite side of the power source is connected through a conductor 138 to a terminal board 139. A conductor 140 connects the scanner control unit 122 to the terminal board 137 and a conductor 141 is connected between the terminal board 137 and the solenoid 125 for operating the valve control switch 123. A conductor 142 is connected between the terminal board 137 and the solenoid operated valve 94 and a conductor 143 is connected from the terminal board 137 through toggle switch 134 to the solenoid operated valve 94. In a similar manner, a conductor 144 is connected from the terminal board 137 through toggle switch 132 with the timer switch 120 and a conductor 145 is connected from the terminal board 137 through toggle switch 133 with motor 54. A conductor 146 is connected from terminal board 139 through toggle switch 131 with the timer switch 120 and a conductor 147 is connected from the terminal board 139 through toggle switch 130 and through the movable knife return switch 148 forming a part of the combination switch 126 to the solenoid operated valve 94. A conductor 149 is connected from the terminal board 139 through toggle switch 129 with the scanner control unit 122 and a conductor 150 is connected from the terminal board 139 to the motor 54. A conductor 151 is connected from the terminal board 139 to the timer switch 120 and a conductor 152 is connected from the terminal board 139 to the solenoid switch 123. Solenoid switch 123 is connected by conductors 153 and 154 to the solenoid operated valve 94 and the solenoid 125 is connected by a conductor 155 to the timer switch 120. Scanner reset switch 156 forming a part of the combined switch 126 is connected through conductors 157 and 158 with the scanner control unit 122. The scanner control unit 122 is connected through conductors 159 and 160 with the timer switch 120 and suitable conductors 161 connect the scanner 118 with the scanner control unit 122.

The apparatus of this invention is primarily intended to cut off predetermined lengths of knitted tubular fabric 162 which as shown in Fig. 5 is provided with spaced flaired portions 163 and in operation, the material 162 is supplied as a strip of indeterminate length, the strip passing over the roll 16 under the roll 17 and up the guide chute 18 and over the aligning roll 26 as shown in Fig. 4. From the aligning roll 26 the material 162 passes over the material engaging bar 27 and between the spaced guides 28 from which the material 162 passes beneath the material engaging tension bar 30. From the tension bar 30 the material 162 passes between the feed roll 32 and the hold down roll 35 and across the upper surface of the mirror 38 beneath the scanner 118. Thereafter, the material 162 passes between the feeding rolls 40 and 41 and over the fixed knife 66 and beneath the movable knife 80 to the delivery roll 72.

Aligning roll 26, feed roll 32, feeding rolls 40 and 41 as well as delivery rolls 72 are all driven in synchronism by the motor 54 and as the material 162 moves across the upper surface of mirror 38, a flaired portion on the material 162 will interrupt the light beam 119 as shown in Fig. 5, whereupon operation of the timer switch 120 will be initiated by the operation of the light sensitive element in scanner 118. At the start of the timing cycle the timer switch 120 will operate to energize the solenoid 125 to reset the switch 123 and during operation of the timer switch 120 to complete the timing cycle the material 162 will continue to move with relation to the fixed knife 66 by reason of the rotation of the rolls. Upon completion of the timing cycle, the timer switch 120 will operate to de-energize the solenoid 125 which will allow the switch 123 to close and open the circuit which serves to energize the solenoid operated valve 94 and move the same to a position to introduce operated valve 94 and move the same to a position to introduce fluid pressure into the upper end of the cylinder 82 thereby moving the connecting rod 81, cross heads 79 and 80 downwardly to cut off a piece of the material 162. Simultaneously with the operation of the switch 123 and valve 94 to move the knife 80 downwardly, the valve 94 will also operate to supply fluid pressure to the upper end of cylinder 89 which will result in movement of connecting rod 92 downwardly to actuate the lever 56 to release the clutch and apply the brake to stop rotation of the drive shaft 55 thereby stopping rotation of the rolls and feeding of the material 162. Consequently, the cutting action of the knife 80 takes place while the material 162 is stationary. When the cross head 79 reaches the downward limit of travel, the same will contact the arm 127 on the combined knife return and scanner reset switch 126 which will result in closing the return switch 148 to move the solenoid operated valve 94 into the opposite position which will result in applying fluid pressure to the lower end of cylinder 82 thereby causing upward movement of the connecting rod 81 and cross head 79 to original position and at the same time, fluid pressure will be supplied to the lower end of cylinder 89 which will result in movement of the connecting rod 92 upwardly to operate the lever 56 which in turn engages the clutch and releases the brake to allow rotation of the shaft 55 and the feeding rolls. At the same time, the scanner reset switch 156 forming a part of the combined switch 126 will operate to reset the scanner 118 for a subsequent operation.

It is to be noted, that a plate 164 is provided above the material 162 adjacent the knife 66 to prevent inadvertent upward movement of the end of the material during the cutting operation. Upon completion of the cutting operation, the cut piece 165 passes over the delivery roll 72 and down the delivery chute 87 into a suitable container.

It will thus be seen that the cutting operation is controlled solely by the duration of the timing cycle, which cycle in turn is initiated by interruption of the light beam 119 projected from the scanner 118 and reflected by the mirror 38 and since the material 162 will move a predetermined distance during the timing cycle, a predetermined length thereof will be cut off without regard for imperfections or other variations in the material 162 which might inadvertently interrupt the light beam 119. Accordingly, the dimensioned instability of the material will have no effect on the length of the piece cut off by the apparatus of this invention and rapid and accurate cutting of such material may be accomplished by this apparatus.

As mentioned above, the apparatus of this invention may also be utilized to cut off dimensionally stable material and the apparatus may also be utilized by a simple switching operation for eliminating operation of the scanner 118 and controlling operation of the cutting knife solely by adjustment of the timer switch.

It will be seen that by this invention there has been provided an apparatus for performing a difficult operation in an exceedingly efficient manner and such apparatus may be conveniently adjusted for automatic high speed operation and may be utilized with material having different characteristics from those described above for illustrative purposes only.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. Automatic cut off apparatus for strip material, said material having longitudinally spaced flared portions connected by substantially straight portions, said apparatus comprising a frame, supply means for said material including spaced rollers mounted on arms extending from said frame and a tapered inclined guide chute, a driven concave material aligning roll mounted on said frame adjacent the upper delivery end of said chute, a material engaging bar spaced from said aligning roll, adjustable spaced material engaging guides on said bar, a material engaging tension bar spaced from said first mentioned bar, a driven feed roll on said frame spaced from said tension bar, a material hold down roll mounted for vertical movement above said feed roll, a pair of vertically spaced feeding rolls mounted on said frame in spaced relation to said feed roll, an upwardly facing mirror mounted on said frame between said feed roll and said feeding rolls, a fixed knife mounted on said frame in spaced relation to said feeding rolls, vertical guides on said frame, a cross head slidably mounted on said guides, a movable knife mounted on said cross head for cooperation with said fixed knife, a driven delivery roller mounted on said frame in spaced relation to said guides, an inclined delivery chute adjacent said delivery roller, a double acting pneumatic cylinder having a piston connected to said cross head, a motor mounted on said frame having a drive shaft, a combined clutch and brake on said drive shaft, a speed reducer coupled to said clutch, drive means connecting said speed reducer to said feeding rolls, said feed roll, said aligning roll and said delivery roll for driving all of said rolls in synchronism, a second double acting pneumatic cylinder having a piston connected to said clutch and brake, a combined light source and light sensitive element mounted on said frame above said mirror for adjustment transversely of the path of movement of said material across said mirror and providing a scanner, means for adjusting the sensitivity of said light sensitive element, and adjustably electronically operated timer switch actuated by said scanner, a four-way solenoid operated valve connected to an air pressure source, conduits connecting said valve to said first and second pneumatic cylinders, whereby with said valve in one position said second piston will move in one direction to disengage said clutch and apply said brake to stop said rolls and said first piston will move in one direction to actuate said movable knife and with said valve in the other position said second piston will move in the opposite direction to release said brake and engage said clutch to start said rolls and said first piston will move in the opposite direction to return said movable knife to original position, a spring actuated solenoid return switch connected to said solenoid valve for moving said valve to said one position, said solenoid return being connected to said timer, a combined movable knife return and scanner reset switch mounted on said frame in the path of movement of said cross head at the lower limit of movement, said movable knife return switch being connected to said solenoid valve for moving said valve to said other position, said reset switch being connected to said scanner to reset the same for a subsequent operation, whereby upon movement of said material across said mirror said flared portion will interrupt a beam of light reflected from said mirror to said light sensitive element to actuate said timer to initiate the timing cycle, and upon completion of said timing cycle said timer will actuate said solenoid valve to stop movement of said material and operate said movable knife to cut off a length of said material, said length being determined by the duration of the timing cycle.

2. Automatic cut off apparatus for strip material, said material having longitudinally spaced flared portions connected by substantially straight portions, said apparatus comprising a frame, supply means for said material including spaced rollers mounted on arms extending from said frame and a tapered inclined guide chute, a driven concave material aligning roll mounted on said frame adjacent the upper delivery end of said chute, a material engaging bar spaced from said aligning roll, adjustable spaced material engaging guides on said bar, a material engaging tension bar spaced from said first mentioned bar, a driven feed roll on said frame spaced from said tension bar, a material hold down roll mounted for vertical movement above said feed roll, a pair of vertically spaced feeding rolls mounted on said frame in spaced relation to said feed roll, an upwardly facing mirror mounted on said frame between said feed roll and said feeding rolls, a fixed knife mounted on said frame in spaced relation to said feeding rolls, vertical guides on said frame, a cross head slidably mounted in said guides, a movable knife mounted on said cross head for cooperation with said fixed knife, a driven delivery roller mounted on said frame in spaced relation to said guides, an inclined delivery chute adjacent said delivery roller, a double acting pneumatic cylinder having a piston connected to said cross head, a motor mounted on said frame having a drive shaft, a combined clutch and brake on said drive shaft, a speed reducer coupled to said clutch, drive means connecting said speed reducer to said feeding rolls, said feed roll, said aligning roll and said delivery roll for driving all of said rolls in synchronism, a second double acting pneumatic cylinder having a piston connecting said clutch and brake, a combined light source and light sensitive element mounted on said frame above said mirror for adjustment transversely of the path of movement of said material across said mirror and providing a scanner, an adjustable electronically operated timer switch actuated by said scanner, a four-way solenoid operated valve connected to an air pressure source, conduits connecting said valve to said first and second pneumatic cylinders, whereby with said valve in one position, said second piston will move in one direction to disengage said clutch and apply said brake to stop said rolls and said first piston will move in one direction to actuate said movable knife and with said valve in the other position said second piston will move in the opposite direction to release said brake and engage said clutch to start said rolls and said first piston will move in the opposite direction to return said movable knife to original position, a spring actuated solenoid return switch connected to said solenoid valve for moving said valve to said one position, said solenoid return being connected to said timer and a combined movable knife return and scanner reset switch mounted on said frame in the path of movement of said cross head at the lower limit of movement, said movable knife return switch being connected to said solenoid valve for moving said valve to said other position, said reset switch being connected to said scanner to reset the same for a subsequent operation, whereby upon movement of said material across said mirror said flared portion will interrupt a beam of light reflected from said mirror to said light sensitive element to actuate said timer to initiate the timing cycle, and upon completion of said timing cycle said timer will actuate said solenoid valve to stop movement of said material and operate said movable knife to cut off a length of said material, said length being determined by the duration of the timing cycle.

3. Automatic cut off apparatus for strip material, said material having longitudinally spaced flared portions connected by substantially straight portions, said apparatus comprising a frame, supply means for said material, a driven concave material aligning roll mounted on said frame, a material engaging bar spaced from said aligning roll, adjustable spaced material engaging guides on said bar, a material engaging tension bar spaced from said first mentioned bar, a driven feed roll on said frame spaced from said tension bar, a material hold down roll mounted for vertical movement above said feed roll, a pair of vertically spaced feeding rolls mounted on said frame in spaced relation to said feed roll, an upwardly facing mirror mounted on said frame between said feed roll and said feeding rolls, a fixed knife mounted on said frame in spaced relation to said feeding rolls, vertical guides on said frame, a cross head slidably mounted in said guides, a movable knife mounted on said cross head for cooperation with said fixed knife, a driven delivery roller mounted on said frame in spaced relation to said guides, an inclined delivery chute adjacent said delivery roller, a double acting pneumatic cylinder having a piston connected to said cross head, a motor mounted on said frame having a drive shaft, a combined clutch and brake on said drive shaft, a speed reducer coupled to said clutch, drive means connecting said speed reducer to said feeding rolls, said feed roll, said aligning roll and said delivery roll for driving all of said rolls in synchronism, a second double acting pneumatic cylinder having a piston connected to said clutch and brake, a combined light source and light sensitive element mounted on said frame above said mirror for adjustment transversely of the path of movement of said material across said mirror and providing a scanner, an adjustable electronically operated timer switch actuated by said scanner, a four-way solenoid operated valve connected to an air pressure source, conduits connecting said valve to said first and second pneumatic cylinders, whereby with said valve in one position said second piston will move in one direction to disengage said clutch and apply said brake to stop said rolls and said first piston will move in one direction to actuate said movable knife and with said valve in the other position said second piston will move in the opposite direction to release said brake and engage said clutch to start said rolls and said first piston will move in the opposite direction to return said movable knife to original position, a spring actuated solenoid return switch connected to said solenoid valve for moving said valve to said one position, said solenoid return being connected to said timer, a combined movable knife return and scanner reset switch mounted on said frame in the path of movement of said cross head at the lower limit of movement, said movable knife return switch being connected to said solenoid valve for moving said valve to said other position, said reset switch being connected to said scanner to reset the same for a subsequent operation, whereby upon movement of said material across said mirror said flared portion will interrupt a beam of light reflected from said mirror to said light sensitive element to actuate said timer to initiate the timing cycle, and upon completion of said timing cycle said timer will actuate said solenoid valve to stop movement of said material and operate said movable knife to cut off a length of said material, said length being determined by the duration of the timing cycle.

4. Automatic cut off apparatus for strip material, said material having longitudinally spaced flared portions connected by substantially straight portions, said apparatus comprising a frame, supply means for said material, a driven concave material aligning roll mounted on said frame, a material engaging bar spaced from said aligning roll, adjustable spaced material engaging guides on said bar, a driven feed roll on said frame spaced from said bar, a material hold down roll mounted above said feed roll, a pair of vertically spaced feeding rolls mounted on said frame in spaced relation to said feed roll, an upwardly facing mirror mounted on said frame between said feed roll and said feeding rolls, a fixed knife mounted on said frame in spaced relation to said feeding rolls, vertical guides on said frame, a cross head slidably mounted in said guides, a movable knife mounted on said cross head for cooperation with said fixed knife, a driven delivery roller mounted on said frame in spaced relation to said guides, an inclined delivery chute adjacent said delivery roller, a double acting pneumatic cylinder having a piston connected to said cross head, a motor mounted on said frame having a drive shaft, a combined clutch and brake on said drive shaft, a speed reducer coupled to said clutch, drive means connecting said speed reducer to said feeding rolls, said feed roll, said aligning roll and said delivery roll for driving all of said rolls in synchronism, a second double acting pneumatic cylinder having a piston connected to said clutch and brake, a combined light source and light sensitive element mounted on said frame above said mirror for adjustment transversely of the path of movement of said material across said mirror and providing a scanner, an adjustably electronically operated timer switch actuated by said scanner, a four-way solenoid operated valve connected to an air pressure source, conduits connecting said valve to said first and second pneumatic cylinders, whereby with said valves in one position said second piston will move in one direction to disengage said clutch and apply said brake to stop said rolls and said first piston will move in one direction to actuate said movable knife and with said valve in the other position said second piston will move in the opposite direction to release said brake and engage said clutch to start said rolls and said first piston will move in the opposite direction to return said movable knife to original position, a spring actuated solenoid return switch connected to said solenoid valve for moving said valve to said one position, said solenoid return being connected to said timer, a combined movable knife return and scanner reset switch mounted on said frame in the path of movement of said cross head at the lower limit of movement, said movable knife return switch being connected to said solenoid valve for moving said valve to said other position, said reset switch being connected to said scanner to reset the same for a subsequent operation, whereby upon movement of said material across said mirror said flared portion will interrupt a beam of light reflected from said mirror to said light sensitive element to actuate said timer to initiate the timing cycle, and upon completion of said timing cycle said timer will actuate said solenoid valve to stop movement of said material and operate said movable knife to cut off a length of said material, said length being determined by the duration of the timing cycle.

5. Automatic cut off apparatus for strip material, said material having longitudinally spaced flared portions connected by substantially straight portions, said apparatus comprising a frame, supply means for said material, a driven concave material aligning roll mounted on said frame, a driven feed roll on said frame spaced from said aligning roll, a material hold down roll mounted above said feed roll, a pair of vertically spaced feeding rolls mounted on said frame in spaced relation to said feed roll, an upwardly facing mirror mounted on said frame between said feed roll and said feeding rolls, a fixed knife mounted on said frame in spaced relation to said feeding rolls, vertical guides mounted on said frame, a cross head slidably mounted in said guides, a movable knife mounted on said cross head for cooperation with said fixed knife, a driven delivery roller mounted on said frame in spaced relation to said guides, an inclined delivery chute adjacent said delivery roller, a double acting pneumatic cylinder having a piston connected to said cross head, a motor mounted on said frame having a drive shaft, a combined clutch and brake on said drive shaft, a speed reducer coupled to said clutch, drive means connecting said speed reducer to said feeding rolls, said feed roll, said aligning roll and said delivery roll for driving all of said rolls in synchronism, a second double acting pneumatic cylinder having a piston connected to said clutch and brake, a combined light source and light sensitive element mounted on said frame above said mirror for adjustment transversely of the path of movement of said material across said mirror and providing a scanner, an adjustable electronically operated timer switch actuated by said scanner, a four-way solenoid operated valve connected to an air pressure source, conduits connecting said valve to said first and second pneumatic cylinders, whereby with said valve in one position said second piston will move in one direction to disengage said clutch and apply said brake to stop said rolls and said first piston will move in one direction to actuate said movable knife and with said valve in the other position said second piston will move in the opposite direction to release said brake and engage said clutch to start said rolls and said first piston will move in the opposite direction to return said movable knife to original position, a spring actuated solenoid return switch connected to said solenoid valve for moving said valve to said one position, said solenoid return being connected to said timer, a combined movable knife return and scanner reset switch mounted on said frame in the path of movement of said cross head at the lower limit of movement, said movable knife return switch being connected to said solenoid valve for moving said valve to said other position, said reset switch being connected to said scanner to reset the same for a subsequent operation, whereby upon movement of said material across said mirror said flared portion will interrupt a beam of light reflected from said mirror to said light sensitive element to actuate said timer to initiate the timing cycle, and upon completion of said timing cycle said timer will actuate said solenoid valve to stop movement of said material and operate said movable knife to cut off a length of said material, said length being determined by the duration of the timing cycle.

6. Automatic cut off apparatus for strip material, said material having longitudinally spaced flared portions connected by substantially straight portions, said apparatus comprising a frame, supply means for said material, a driven concave material aligning roll mounted on said frame, a driven feed roll on said frame spaced from said aligning roll, a pair of vertically spaced feeding rolls mounted on said frame in spaced relation to said feed roll, an upwardly facing mirror mounted on said frame between said feed roll and said feeding rolls, a fixed knife mounted on said frame in spaced relation to said feeding rolls, vertical guides on said frame, a cross head slidably mounted in said guides, a movable knife mounted on said cross head for cooperation with said fixed knife, a driven delivery roller mounted on said frame in spaced relation to said guides, an inclined delivery chute adjacent said delivery roller, a double acting pneumatic cylinder having a piston connected to said cross head, a motor mounted on said frame having a drive shaft, a combined clutch and brake on said drive shaft, a speed reducer coupled to said clutch, drive means connecting said speed reducer to said feeding rolls, said feed roll, said aligning roll and said delivery roll for driving all of said rolls in synchronism, a second double acting pneumatic cylinder having a piston connected to said clutch and brake, a combined light source and light sensitive element mounted on said frame above said mirror for adjustment transversely of the path of movement of said material across said mirror and providing a scanner, an adjustable electronically operated timer switch actuated by said scanner, a four-way solenoid operated valve connected to an air pressure source, conduits connecting said valve to said first and second pneumatic cylinders, whereby with said valve in one position said second piston will move in one direction to disengage said clutch and apply said brake to stop said rolls and said first piston will move in one direction to actuate said movable knife and with said valve in the other position said second piston will move in the opposite direction to release said brake and engage said clutch to start said rolls and said first piston will move in the opposite direction to return said movable knife to said original position, a spring actuated solenoid return switch connected to said solenoid valve for moving said valve to said one position, said solenoid return being connected to said timer, a combined movable knife return and scanner reset switch mounted on said frame in the path of movement of said cross head at the lower limit of movement, said movable knife return switch being connected to said solenoid valve to move said valve to said other position, said reset switch being connected to said scanner to reset the same for a subsequent operation, whereby upon movement of said material across said mirror said flared portion will interrupt a beam of light reflected from said mirror to said light sensitive element to actuate said timer to initiate the timing cycle, and upon completion of said timing cycle said timer will actuate said solenoid valve to stop movement of said material and operate said knife to cut off a length of said material, said length being determined by the duration of the timing cycle.

7. Automatic cut off apparatus for strip material, said material having longitudinally spaced flared portions connected by substantially straight portions, said apparatus comprising a frame, supply means for said material, a driven material aligning roll mounted on said frame, a driven feed roll on said frame spaced from said aligning roll, a pair of vertically spaced feeding rolls mounted on said frame in spaced relation to said feed roll, an upwardly facing mirror mounted on said frame between said feed roll and said feeding rolls, a fixed knife mounted on said frame in spaced relation to said feeding rolls, vertical guides on said frame, a cross head slidably mounted on said guides, a movable knife mounted on said cross head for cooperation with said fixed knife, a driven delivery roller mounted on said frame and in spaced relation to said guides a double acting pneumatic cylinder having a piston connected to said cross head, a motor mounted on said frame having a drive shaft, a combined clutch and brake on said drive shaft, a speed reducer coupled to said clutch, drive means connecting said speed reducer to said feeding rolls, said feed roll, said aligning roll and said delivery roll for driving all of said rolls in synchronism, a second double acting pneumatic cylinder having a piston connected to said clutch and brake, a combined light source and light sensitive element mounted on said frame above said mirror for adjustment transversely of the path of movement of said material across said mirror and providing a scanner, an adjustable electronically operated timer switch actuated by said scanner, a four-way solenoid operated valve connected to an air pressure source, conduits connecting said valve to said first and second pneumatic cylinders, whereby with said valve in one position said second piston will move in one direction to disengage said clutch and apply said brake to stop said rolls and said first piston will move in one direction to actuate said movable knife and with said valve in the other position said second piston will move in the opposite direction to release said brake and engage said clutch to start said rolls and said first piston will move in the opposite direction to return said movable knife to original position, a spring actuated solenoid return switch connected to said solenoid valve for moving said valve to said one position, said solenoid return being connected to said timer, a combined movable knife return and scanner reset switch mounted on said frame in the path of movement of said cross head at the lower limit of movement, said movable knife return switch being connected to said solenoid valve for moving said valve to said other position, said reset switch being connected to said scanner to reset the same for a subsequent operation, whereby upon movement of said material across said mirror said flared portion will interrupt a beam of light projected from said mirror to said light sensitive element to actuate said timer to initiate the timing cycle, and upon completion of said timing cycle said timer will actuate said solenoid valve to stop movement of said material and operate said movable knife to cut off a length of said material, said length being determined by the duration of the timing cycle.

8. Automatic cut off apparatus for strip material, said material having longitudinally spaced flared portions connected by substantially straight portions, said apparatus comprising a frame, supply means for said material, a driven material aligning roll mounted on said frame, a driven feed roll on said frame spaced from said aligning roll, a pair of vertically spaced feeding rolls mounted on said frame in spaced relation to said feed roll, an upwardly facing mirror mounted on said frame between said feed roll and said feeding rolls, a fixed knife mounted on said frame in spaced relation to said feeding rolls, vertical guides on said frame, a cross head slidably mounted in said guides, a movable knife mounted on said cross head for cooperation with said fixed knife, a driven delivery roller mounted on said frame in spaced relation to said guides, a double acting pneumatic cylinder having a piston connected to said cross head, a motor mounted on said frame having a drive shaft, a combined clutch and brake on said drive shaft, drive means connecting said shaft to said feeding rolls, said feed roll, said aligning roll and said delivery roll for driving all of said rolls in synchronism, a second double acting pneumatic cylinder having a piston connected to said clutch and brake, a combined light source and light sensitive element mounted on said frame above said mirror for adjustment transversely of the path of movement of said material across said mirror and providing a scanner, an adjustable electronically operated timer switch actuated by said scanner, a four-way solenoid operated valve connected to an air pressure source, conduits connecting said valve to said first and second pneumatic cylinders, whereby with said valve in one position said second piston will move in one direction to disengage said clutch and apply said brake to stop said rolls and said first piston will move in one direction to actuate said movable knife and with said valve in the other position said second piston will move in the opposite direction to release said brake and engage said clutch to start said rolls and said first piston will move in the opposite direction to return said movable knife to original position, a spring actuated solenoid return switch connected to said solenoid valve for moving said valve to said one position, said solenoid return being connected to said timer, and a combined movable knife return and scanner reset switch mounted on said frame in the path of movement of said cross head at the lower limit of movement, said movable knife return switch being connected to said solenoid valve for moving said valve to said other position, said reset switch being connected to said scanner to reset the same for a subsequent operation, whereby upon movement of said material across said mirror said flared portion will interrupt a beam of light from said mirror to said light sensitive element to actuate said timer to initiate the timing cycle, and upon completion of said timing cycle said timer will actuate said solenoid valve to stop movement of said material and operate said movable knife to cut off a length of said material, said length being determined by the duration of the timing cycle.

9. Automatic cut off apparatus for strip material, said material having longitudinally spaced flared portions connected by substantially straight portions, said apparatus comprising a frame, supply means for said material, a driven material aligning roll mounted on said frame, a driven feed roll on said frame spaced from said aligning roll, a pair of vertically spaced feeding rolls mounted on said frame in spaced relation to said feed roll, an upwardly facing mirror mounted on said frame between said feed roll and said feeding rolls, a fixed knife mounted on said frame in spaced relation to said feeding rolls, vertical guides on said frame, a cross head slidably mounted in said guides, a movable knife mounted on said cross head for cooperation with said fixed knife, a driven delivery roller mounted on said frame in spaced relation to said guides, a double acting pneumatic cylinder having a piston connected to said cross head, a motor mounted on said frame having a drive shaft, a combined clutch and brake on said drive shaft, drive means connecting said shaft to said feeding rolls, said feed roll, said aligning roll and said delivery roll for driving all of said rolls in synchronism, a second double acting pneumatic cylinder having a piston connected to said clutch and brake, a combined light sensitive element mounted on said frame above said mirror and providing a scanner, an electronically operated timer switch actuated by said scanner, a four-way solenoid operated valve connected to an air pressure source, conduits connecting said valve to said first and second pneumatic cylinders, whereby with said valve in one position said second piston will move in one direction to disengage said clutch and apply said brake to stop said rolls and said first piston will move in one direction to actuate said movable knife and with said valve in the other position said second piston will move in the opposite direction to release said brake and engage said clutch to start said rolls and said first piston will move in the opposite direction to return said movable knife to original position, a spring actuated solenoid return switch connected to said solenoid valve for moving said valve to said one position, said solenoid return being connected to said timer, and a combined movable knife return and scanner reset switch mounted on said frame in the path of movement of said cross head at the lower limit of movement, said movable knife return switch being connected to said solenoid valve for moving said valve to said other position, said reset switch being connected to said scanner to reset the same for a subsequent operation, whereby upon movement of said material across said mirror said flared portion will interrupt a beam of light reflected from said mirror to said light sensitive element to actuate said timer to initiate the timing cycle, and upon completion of said timing cycle said timer will actuate said solenoid valve to stop movement of said material and operate said movable knife to cut off a length of said material, said length being determined by the duration of the timing cycle.

10. Automatic cut off apparatus for strip material, said material having longitudinally spaced flared portions connected by substantially straight portions, said apparatus comprising a frame, supply means for said material, a driven material aligning roll mounted on said frame, a driven feed roll on said frame spaced from said aligning roll, a pair of vertically spaced feeding rolls mounted on said frame in spaced relation to said feed roll, an upwardly facing mirror mounted on said frame between said feed roll and said feeding rolls, a fixed knife mounted on said frame in spaced relation to said feeding rolls, vertical guides on said frame, a cross head slidably mounted on said guides a movable knife mounted on said cross head for cooperation with said fixed knife, a driven delivery roller mounted on said frame in spaced relation to said guides, cross head reciprocating means, a motor mounted on said frame having a drive shaft, a combined clutch and brake mounted on said drive shaft, drive means connecting said shaft to said feeding rolls, said feed roll, said aligning roll and said delivery roll for driving all of said rolls in synchronism, clutch and brake operating means, a combined light source and light sensitive element mounted on said frame above said mirror and providing a scanner, an electronically operated timer switch actuated by said timer, control means for said reciprocating means and said clutch and brake operating means, whereby with said control means in one position said operating means will disengage said clutch and apply said brake to stop said rolls and said reciprocating means will move in one direction to actuate said movable knife and with said control means in the other position said operating means will release said brake and engage said clutch to start said rolls and said reciprocating means will move in the opposite direction to return said movable knife to original position, a spring actuated solenoid return switch connected to said control means for moving said control means to said one position, said solenoid return being connected to said timer, and a combined movable knife return and scanner reset switch mounted on said frame in the path of movement of said cross head at the lower limit of movement, said movable knife return switch being connected to said control means for moving said control means to said other position, said reset switch being connected to said scanner to reset the same for a subsequent operation, whereby upon movement of said material across said mirror said flared portion will interrupt a beam of light reflected from said mirror to said light sensitive element to actuate said timer to initiate the timing cycle, and upon completion of said timing cycle said timer will actuate said control means to stop movement of said material and operate said movable knife to cut off a length of said material, said length being determined by the duration of the timing cycle.

References Cited in the file of this patent
UNITED STATES PATENTS

| | | |
|---|---|---|
| 2,077,439 | Schmitt | Apr. 20, 1937 |
| 2,458,612 | Luzzatto et al. | Jan. 11, 1949 |
| 2,754,908 | Proud | July 17, 1956 |